United States Patent
Speakman

(12) 
(10) Patent No.: US 6,372,867 B1
(45) Date of Patent: Apr. 16, 2002

(54) PROCESS FOR THE GAS PHASE POLYMERIZATION OF OLEFINS

(75) Inventor: John Gabriel Speakman, Martigues (FR)

(73) Assignee: BP Chemical Limited, London (GB)

( * ) Notice: Subject to any disclaimer, the term of this patent is extended or adjusted under 35 U.S.C. 154(b) by 0 days.

(21) Appl. No.: 09/522,598

(22) Filed: Mar. 10, 2000

Related U.S. Application Data

(63) Continuation of application No. PCT/GB98/02674, filed on Sep. 4, 1998.

(30) Foreign Application Priority Data

Sep. 11, 1997 (EP) .............................. 97430023

(51) Int. Cl.⁷ .................................. C08F 4/24
(52) U.S. Cl. ...................... 526/106; 526/105; 526/130; 526/901
(58) Field of Search ................ 526/106, 105, 526/130, 901, 348.2, 348.5, 348.6

(56) References Cited

U.S. PATENT DOCUMENTS

RE35,324 E * 9/1996 Bailly et al. ................ 428/407
RE35,346 E * 10/1996 Bailly et al. ................ 526/106

FOREIGN PATENT DOCUMENTS

| DE | 26 53 666 |   | 5/1978 |
|----|-----------|---|--------|
| EP | 0 055 863 |   | 7/1982 |
| EP | 0055863   | * | 7/1982 |
| EP | 0 075 421 |   | 3/1983 |
| EP | 0075421   | * | 3/1983 |
| EP | 0 435 515 |   | 7/1991 |
| FR | 2 609 036 |   | 7/1988 |

* cited by examiner

Primary Examiner—David W. Wu
Assistant Examiner—William K Cheung
(74) Attorney, Agent, or Firm—Finnegan, Henderson, Farabow, Garrett & Dunner, L.L.P.

(57) ABSTRACT

An improved chromium oxide-based catalyst supported on a granular or microspherical refractory oxide for the gas phase polymerization of at least one alpha olefin containing from 2 to 12 carbon atoms, wherein the supported chromium oxide-based catalyst has been subjected to a sole calcination/activation step consisting of a single thermal treatment performed at a temperature ranging from 200° to 450° C. under an oxygen containing atmosphere, and an olefin polymerization process employing such catalyst.

7 Claims, No Drawings

PROCESS FOR THE GAS PHASE POLYMERIZATION OF OLEFINS

This application is a continuation of International Application No. PCT/GB98/02674, filed Sep. 4, 1998, the content of which is incorporated herein by reference.

The present invention relates to a process for gas phase polymerisation of olefins with the aid of a supported chromium oxide based catalyst.

It is known from GB 1,429,174 to prepare olefin polymerisation catalysts by impregnating a refractory oxide carrier with a titanium compound, subjecting the resulting product to a calcination step by heating at a temperature T1 of between 150 and 1200° C., adding a chromium compound and subjecting the resulting product to an activation step by heating at a temperature T2 of between 100 and 1200° C. Thus, according to GB 1,429,174, two separate thermal treatments (T1, T2), which will be hereinafter referred to as a calcination procedure and an activation procedure are necessary for obtaining the desired catalyst.

It is known from U.S. Pat. No. 3,622,521 to use titanium modified chromium oxide based catalysts for the polymersation of ethylene in slurry. This patent discloses a final activation step of the catalyst which can be carried out in dry air for from 1 to 50 hours using a temperature in the range from 350° to 2000° F. (176° to 1093° C.). All the catalysts of U.S. Pat. No. 3,622,521 are prepared using an activation procedure of 5 hours in dry air at 1300° F. (704° C.).

It is known from U.S. Pat. No. 4,011,382 to prepare ethylene polymers by a gas phase polymerisation process with the aid of a titanium modified chromium oxide based catalyst. This patent describes a final activation step of the catalyst which can e be performed by heating the catalyst in air or oxygen at a temperature of 300° to 900° C., and preferably at 700° to 850° C. All the catalysts of U.S. Pat. No. 4,011,382 are prepared using an activation procedure of 8 hours in dry air at either 750° C. or 825° C.

It is known from EP 0 055 863, to use a chromium supported catalyst for polymerising olefins. All the catalysts disclosed in said patent application are supported on an aluminium phosphate-containing base.

It is also common general knowledge that there is a quasi linear relationship between the temperature of activation and both the activity of the catalyst and the melt index of the ethylene polymer prepared from said chromium oxide catalyst. The higher the temperature of activation, the higher the activity and the melt index.

Therefore, the man in the art knows that in order to properly activate the chromium oxide based catalyst activation temperatures above at least about 500° C. should be used.

These calcination/activation procedures applied to the modified support are long and costly. However, as these procedures are necessary to obtain good activity of the final catalyst and a high melt index of the resulting ethylene polymer the man in the art continues to proceed in the same way.

It is therefore an objective of the present invention to provide a process for preparing ethylene (co-)polymers having a high melt index in the presence of a supported chromium oxide based catalyst having reasonably good activity and which does not require these lengthy and/or high temperature calcination/activation procedures.

It has now unexpectedly been found that while said aforementioned quasi linear relationship between the activation temperature and the catalyst activity and melt index of the resulting (co)polymer could systematically be verified in slurry polymerisation, this is not the case when using supported chromium oxide based catalyst in gas phase (co)polymerisation of ethylene.

The present invention makes it possible to avoid or at least mitigate the disadvantages referred to above. In particular, a gas phase polymerisation process has now been found which makes it possible to manufacture polymers having a high melt index with a supported chromium based catalyst showing good activity and which is prepared according to a simple and economical process. Furthermore, the polymers obtained according to the present invention have good stress cracking resistance and a high critical shear rate. As a result the polymers are easy to process. Furthermore, the polymers obtained can have a low volatile content i.e. they give rise to a very small quantity of volatile matter (fumes) during the manufacture of articles. They also can have a high impact strength and a low die swell.

The subject of the invention is therefore a process for the gas phase polymerisation of at least one alpha olefin containing from 2 to 12 carbon atoms, characterised in that the polymerisation is performed with the aid of a chromium oxide based catalyst supported on a granular or microspherical refractory oxide which has been subjected to a sole calcination/activation step consisting of a single thermal treatment performed at a temperature ranging from 200 to 450° C. under an oxygen-containing atmosphere.

According to the invention a polymerisation reaction of at least one alpha-olefin is carried out with the aid of such a supported chromium oxide based catalyst.

Another object of the present invention is a method for the preparation of a chromium oxide based catalyst supported on a granular or microspherical refractory oxide for the gas phase polymerisation of olefin(s) characterised in that the supported chromium oxide based catalyst is subjected to a sole calcination/activation step consisting of a single thermal treatment performed at a temperature ranging from 200 to 450° C. under an oxygen-containing atmosphere.

Still another object of the present invention is to provide an improved chromium oxide based catalyst supported on a granular or microspherical refractory oxide for the gas phase polymerisation of olefin(s), wherein the catalyst is obtainable by a preparation which is characterised in that the supported chromium oxide based catalyst is subjected to a sole calcination/activation step consisting of a single thermal treatment performed at a temperature ranging from 200 to 450° C. under an oxygen-containing atmosphere.

The supported chromium oxide based catalyst contains in most cases from 0.1 to 3% of chromium. According to a preferred embodiment of the present invention, the catalyst is advantageously a titanium or aluminium modified supported chromium oxide based catalyst, most preferably a titanium modified supported chromium oxide based catalyst. For example, the catalyst can be modified with from 0.1 to 8% by weight titanium or 0.1 to 6% by weight of aluminium.

The catalyst is supported on a granular or microspherical refractory oxide such as silica, alumina, zirconia oxide or a mixture or a coprecipitate of these oxides. The support can be obtained by various known processes, especially by precipitation of silicon compounds such as, for example, silica, from a solution of an alkali metal silicate, (or else by coprecipitation of a refractory oxide gel or hydrogel from solutions containing at least two compounds chosen from silicon, titanium, zirconium or aluminium compounds).

The granular support advantageously has a specific (BET) surface of between 200 and 1200 $m^2/g$, a pore volume ranging from 1 to 3.5 ml/g, and can consist of particles which have a diameter of between 20 and 250 μm, preferably between 30 and 150 μm. It advantageously contains hydroxyl functional groups and is preferably free from water at the time of its use during the preparation of the catalyst. For this purpose it can be heated to a temperature ranging e.g. from 100 to 200° C.

The catalyst is preferably prepared by a process comprising a first stage during which the support is impregnated with a chromium compound, and a second optional stage during which the product originating from the first stage is impregnated with either a titanium or an aluminium compound. The chromium compound employed can be a chromium oxide, generally of formula $CrO_3$, or a chromium compound which can be converted into chromium oxide by calcining, such as, for example, a chromium nitrate or sulfate, an ammonium chromate, a chromium carbonate, acetate or acetylacetonate or else a tertbutyl chromate.

Titanium compounds which can advantageously be employed are titanium alcoholate such as, for example, titanium tetraisopropylate or titanium tetra-butylate.

Aluminium compounds which can advantageously be employed are for example of the acetyl acetate, acetylacetonate, alkoxy, or alkyl types.

The impregnation of the support with the titanium or the aluminium compound can be performed advantageously just before or during the sole calcination/activation step applied to the catalyst.

The catalyst can also be prepared by a process which consists of a coprecipitation of a gel or hydrogel such as that referred to above in the presence of a chromium compound and of a titanium compound, so that a cogel is formed. comprising, on the one hand, at least one refractory oxide such as silica or alumina, and, on the other hand, a chromium compound and a titanium compound.

Prior to its use the supported catalyst must be subjected to a sole calcination/activation step which consists of a single thermal treatment performed at a temperature ranging from 200 to 450° C. under an oxygen-containing atmosphere.

According to the invention said sole calcination/activation treatment of the catalyst must be carried out at a low temperature, in particular at a temperature of between 200° C. and 450° C., and preferably from 300 to 400° C.

According to the invention said sole calcination/activation treatment of the catalyst must be carried out under an oxygen-containing atmosphere, preferably under dry air.

Said single treatment lasts on average between 10 minutes and 12 hours and more particularly between 30 minutes and 8 hours. It can be performed by known means using a non reducing atmosphere. For example, it can be carried out in a fluidised bed activator.

The obtained catalyst can be directly injected into the gas phase polymerisation reactor. It can also be introduced in the form of a prepolymer prepared previously during a prepolymerisation stage. The prepolymerisation stage consists of bringing the catalyst into contact, for example, with ethylene optionally mixed with an alpha-olefin and optionally in the presence of hydrogen. The prepolymerisation stage may be carried out in the presence of an organometallic compound of metal of groups 2 and 13 and optionally 1 and 12 of the periodic classification of the elements.

The gas phase polymerisation of the alpha-olefin may be carried out in a fluidised and/or mechanically stirred bed reactor, according to any known methods. The polymerisation reaction can be carried out at a temperature of between 0 to 120° C., preferably between 50 to 110° C., and at a total pressure ranging from 0.1 to 5 MPa.

The process according to this invention is particularly suitable for the manufacture of ethylene polymers such as, for example, ethylene homopolymers or ethylene copolymers containing at least one alpha-olefin containing from 3 to 12 carbon atoms such as, for example, 1-butene, 1-hexene or 1-octene. In general, the ethylene copolymers prepared by the process according to this invention contain, in addition to ethylene, less than 10% and in most cases less than 4% and preferably less than 1% by weight of another alpha-olefin containing from 3 to 12 carbon atoms.

The polymers obtained by the process according to this invention may have a relative density ranging from 0.915 to 0.970, preferably ranging from 0.935 and 0.965 and more particularly from 0.940 to 0.960. In most cases, they have a molecular weight distribution, (MWD), measured as the ratio of the weight average molecular weight, $M_W$ to the number average molecular weight, $M_N$, of between 5 and 55. In most cases, they have a weight average molecular weight of between 50,000 and 500,000. In general, they contain less than 5 ppm of chromium because of the good activity of the catalyst. Furthermore, they generally have a stress cracking resistance greater than 10 hours and in most cases greater than 15 hours. They also generally have a critical shear rate greater than 800 $s^{-1}$ and in most cases greater than 1000 $s^{-1}$.

The unexpected advantage obtained according to the present invention is the relatively high melt index values of the polymers. As already explained hereinabove and further illustrated in the following (comparative) examples, it is quite surprising that supported chromium oxide based catalysts which have been subjected to a sole calcination/activation treatment at a low temperature produce, when used in gas phase processes, polymers having high melt index values.

When the catalyst is activated at a temperature from 200 to 450° C., it is possible to prepare polymers having a high melt index, for example a melt index $MI_5$ higher than 1.5 g/10 minutes. In these ranges the melt index of the polymer increases when the activation temperature decreases.

Such polymers, in particular polymer having a $MI_5$ higher than 1.5 g/10 minutes, the critical shear rate may be greater than 1200 $s^{-1}$.

The polymer also contains a very low proportion of volatile substances. These substances generally represent, on a weight basis, less than 800 and more particularly less than 500 and in most cases less than 400 parts per million (ppm) of the polymer. Furthermore, they generally have a drop strength greater then 2 m and in most cases greater than 2.5 m. They have a low die swell, in particular less than 35 g.

The polymers obtained according to the process of this invention are particularly suitable for the manufacture of objects by extrusion or by blow extrusion.

The following examples illustrate the present invention.

The polymer properties have been measured according to the following procedures.

Method of Determination of the Stress Cracking Resistance

The stress cracking resistance is measured on polymer bottles according to the method of M. J. Cawood and T. J. C. Sleeman (BP Chemicals Ltd. Great Britain), which is described in the journal Polymer Testing 1(1980) pages 191 to 199, except for the fact that the bottles are kept at 50° C. instead of 60° C. According to this method, the stress cracking resistance is expressed in hours.

Method of Determination of the Volatile Matter Content of a Polymer

According to the invention the volatile matter content of a polymer is determined by measuring the loss in weight of the polymer after it has been kept in an oven at 100° C. for 17 hours. The loss in weight is expressed in ppm.

Method of Determination of the Critical Shear Rate

The critical shear rate is determined from a curve which gives the stress imposed on the polymer as a function of the shear rate to which the polymer is subjected, which has been established with the aid of a capillary rheometer which has a die in which the ratio of its length to its diameter is 30. The critical shear rate is determined as the lowest value of the shear rate at which a stress stability is observed. At this value the curve exhibits a point of inflection. The shear stress and rate are defined in ASTM Standard D 3835. A shear rate is expressed in $s^{-1}$.

Fine Particle Content

According to the present invention the fine particle content is the proportion of particles in the polymer having a diameter of less than 125 $\mu$m. The content is expressed in weight percent.

Flow Parameter

The flow parameter "n" is calculated by the formula n=log $(MI_{21.6}/MI_5)/\log(21.6/5)$ according to method ASTM D-1238 The melt index is expressed in g/10 minutes.

EXAMPLES 1, 2, C3 a) Catalyst Preparation

Catalyst is activated by thermal activation, which is carried out in a quartz tube heated from the outside by a surrounding electric furnace. A coarse fritted disk fused to the tube serves to support the fluidised bed. The temperature of the bed is measured by a thermocouple placed near the centre. Gases used in the activation flow upward through the disk, producing fluidisation.

25 grams of a chromium oxide based catalyst composition sold under the registered trade mark <<EP30>> (by Joseph Crosfield and Sons, Warrington, United Kingdom) are introduced into the quartz tube fluidised with a current of dry nitrogen at room temperature. This solid composition contains about 1% by weight of chromium in the form of trivalent chromium acetate supported on silica. The quartz tube is then heated from room temperature to 150° C. at a rate of 57° C./h and is maintained at 150° C. Thereafter a mixture of titanium tetraisopropylate and tetra-n-butylate sold under the registered trade mark <<Tilcom BIP >> (by Titanium Intermediates Limited, Billingham, United Kingdom) is added to the reactor in a quantity corresponding to 23.44 millimoles of titanium. The catalytic solid thus formed is maintained at 150° C. for 3 hours. The reactor is then heated to 300° C. at a rate of 57° C./h and is maintained at this temperature for 1 hour. The fluidising nitrogen is then replaced by a dry air stream and the catalytic solid is successively heated from 300 to the final activation temperature (400, 450 and 500° C. respectively giving catalyst 1a, 2a and C3a), maintained at this temperature for 5 hours, then finally cooled at a rate of 57° C./h to 325° C. The fluidising air is then replaced by a dry nitrogen stream and the catalytic solid is cooled slowly to ambient temperature.

24.5 grams of an activated catalyst containing 4.5% by weight of titanium and 0.98% by weight of chromium are recovered; this catalyst is composed of particles with a weight average diameter of 100 $\mu$m. It is stored in an atmosphere of dry nitrogen.

b) Gas Phase Polymerisation of Ethylene 400 grams of polyethylene pellets prepared in a previous polymerisation are introduced into a stainless steel reactor of capacity 2.6 liters equipped with a powder stirrer turning at 200 rpm and maintained under a nitrogen atmosphere. Temperature control is provided by circulating silicon oil which cools and which is itself heated by water and steam in the surrounding jacket. The temperature is kept within +/-0.5° C. of the desired temperature. The reactor is heated to 104° C. and around 50 milligrams of one of the above catalysts (see hereabove catalysts 1a, 2a and C3a) are introduced. 0.5 gram of silica containing 1.5 milllimoles of triethylaluminium per gram is then introduced into the reactor to scavenge poisons. Then hydrogen is introduced to pressurize the reactor to 0.1 MPa. Finally ethylene is introduced until a total pressure of 0.9 MPa is obtained. Ethylene introduction is continued to maintain reactor pressure at 0.9 MPa. The reaction is continued until 2500 grams of polymer are formed per gram of catalyst. The contents of the reactor are then recovered and the polyethylene powder formed in the reaction is separated from the pellets by sieving. The catalyst activity and the properties of the polymer produced are shown in table 1.

EXAMPLES C4 to C6

Comparative a) Catalyst Preparation

Exactly the same catalysts were used as in Examples 1 to C3.

b) Slurry Phase Polymerisation of Ethylene

Slurry polymerisation experiments are conducted in a stainless steel reactor of capacity 2 liters equipped with an updraught, three-blade marine propeller turning at 400 rpm and maintained under a nitrogen atmosphere. The reactor is heated to 104° C. and around 250 milligrams of one of the above catalysts (ie catalysts 1a, 2a and C3a) are introduced. 1 liter of dry isobutane is then introduced. Ethylene is supplied at 4 MPa which is kept constant during the polymerisation reactions. Induction time is taken from the time when reactor pressure reaches 4 MPa to the time when ethylene flow restarts. The reaction is timed from when the ethylene flow restarts. During polymerisation, ethylene flow rate increases gradually from 0 to 600 g/h. The reaction is stopped when productivity reaches 2500 gram polymer per gram catalyst. The catalyst activity and the properties of the polymer produced are shown in Table 1.

TABLE 1

| Example | Catalyst | Reactor | Activity g/g.h.b | MI g/10 min | HLMI g/10 min | n |
|---|---|---|---|---|---|---|
| 1 | 1a | Gas phase | 18.5 | 0.56 | 57.0 | 2.01 |
| C4 | 1a | Slurry | V.L. | N.D. | N.D. | N.D. |
| 2 | 2a | Gas phase | 156 | 0.60 | 59.5 | 2.00 |
| C5 | 2a | Slurry | 27 | 0.67 | 66.0 | 2.00 |
| C3 | C3a | Gas phase | 194 | 0.31 | 30.4 | 1.99 |
| C6 | C3a | Slurry | 59 | 0.52 | 46.2 | 1.95 |

V.L. = very low
N.D. = not determined

EXAMPLE 7 a) Catalyst Preparation 30 grams of a chromium oxide based catalyst composition sold under the registered trade mark <<EP211B>> (by Joseph Crosfield and Sons, Warrington, United Kingdom) are introduced into a reactor heated to 93° C. and fluidised with a current of dry nitrogen. This solid composition contains about 1% by weight of chromium in the form of trivalent chromium acetate and about 2.1% by weight of aluminium supported on silica. The reactor is then heated from 93 to 150° C. at a rate of 90° C./h and is maintained at 150° C. for 30 minutes. The reactor is then heated to 300° C. at a rate of 90° C./h and is maintained at this temperature for 4 hours. The fluidising nitrogen is then replaced by a dry air stream and the catalytic solid is successively heated from 300 to 450° C., maintained at 450° C. for 4 hours, then finally cooled at a rate of 90° C./h to 300° C. The fluidising air is then replaced by a dry nitrogen stream and the catalytic solid is cooled slowly to ambient temperature.

25 grams of an activated catalyst containing 2.1% by weight of aluminium and 1% by weight of chromium are recovered; this catalyst is composed of particles with a weight average diameter of 100 μm. It is stored in an atmosphere of dry nitrogen.

b) Gas Phase Polymerisation of Ethylene 200 grams of polyethylene powder prepared in a previous polymerisation are introduced into a stainless steel reactor of capacity 2.6 liters equipped with a powder stirrer turning at 350 rpm and maintained under a nitrogen atmosphere. The reactor is heated to 100° C. and 210 milligrams of the above catalyst (7a) are introduced. 0.2 millimoles of triethylaluminium are then introduced into the reactor to scavenge poisons. Hydrogen is then introduced to pressurize the reactor to 0.3 MPa. Finally ethylene is introduced until a total pressure of 1.5 MPa is obtained. Ethylene introduction is continued at a rate of 183 g/h over 2 hours and 18 minutes. The average activity over this period is 810 g/mM.h.b. 600 grams of polyethylene are recovered from the reactor; its properties are:

| | |
|---|---|
| Bulk density | 370 kg/m3 |
| High load melt index | 138 g/10 minutes |
| (ASTM method D-1238, measured at 190° C.) | |
| Mean particle size | 660 μm |
| Density | 940.6 kg/m3 |
| Polydispersity | 10.7 | a) Catalyst Preparation 30 grams of a chromium oxide based catalyst composition sold under the registered trade mark <<EP211B >> (by Joseph Crosfield and Sons, Warrington, United Kingdom) are introduced into a reactor heated to 93° C. and fluidised with a current of dry nitrogen. This solid composition contains about 1% by weight of chromium in the form of trivalent chromium acetate and about 2.1% by weight of aluminium supported on silica. The reactor is then heated from 93 to 150° C. at a rate of 90° C./h and is maintained at 150° C. for 30 minutes. The reactor is then heated to 300° C. at a rate of 90° C./h and is maintained at this temperature for 4 hours. The fluidising nitrogen is then replaced by a dry air stream and the catalytic solid is successively heated from 300 to 600° C., maintained at 600° C. for 4 hours, then finally cooled at a rate of 90° C./h to 300° C. The fluidising air is then replaced by a dry nitrogen stream and the catalytic solid is cooled slowly to ambient temperature.

25 grams of an activated catalyst containing 2.1% by weight of aluminium and 1% by weight of chromium are recovered; this catalyst is composed of particles with a weight average diameter of 100 μm. It is stored in an atmosphere of dry nitrogen.

b) Gas Phase Polymerisation of Ethylene 200 grams of polyethylene powder prepared in a previous polymerisation are introduced into a stainless steel reactor of capacity 2.6 liters equipped with a powder stirrer turning at 350 rpm and maintained under a nitrogen atmosphere. The reactor is heated to 100° C. and 210 milligrams of the above catalyst (8a) are introduced. 0.2 millimoles of triethylaluminium are then introduced into the reactor to scavenge poisons. Hydrogen is then introduced to pressurise the reactor to 0.3 MPa. Finally ethylene is introduced until a total pressure of 1.5 MPa is obtained. Ethylene introduction is continued at a rate of 183 g/h over 2 hours and 18 minutes. The average activity over this period is 680 g/mM.h.b. 600 grams of polyethylene are recovered from the reactor; its properties are:

| | |
|---|---|
| Bulk density | 290 kg/m3 |
| High load melt index | 8.6 g/10 minutes |
| (ASTM method D-1238, measured at 190° C.) | |
| Mean particle size | 1010 μm |
| Density | 945.8 kg/m3 |
| Polydispersity | 14.7 |

EXAMPLE 9 a) Catalyst Preparation 30 kilograms of a chromium oxide based catalyst composition sold under the registered trade mark <<EP30>> (by Joseph Crosfield and Sons, Warrington, United Kingdom) are introduced into a reactor heated to 93° C. and fluidised with a current of dry nitrogen. This solid composition contains about 1% by weight of chromium in the form of trivalent chromium acetate supported on silica. The reactor is then heated from 93 to 150° C. at a rate of 90° C./h and is maintained at 150° C. for 30 minutes. Thereafter a mixture of titanium tetraisopropylate and tetra-n-butylate sold under the registered trade mark <<Tilcom BIP>> (by Titanium Intermediates Limited, Billingham, United Kingdom) is added to the reactor in a quantity corresponding to 23.75 moles of titanium. The catalytic solid thus formed is maintained at 150° C. for 2 hours. The reactor is then heated to 300° C. at a rate of 90° C./h and is maintained at this temperature for 4 hours. The fluidising nitrogen is then replaced by a dry air stream and the catalytic solid is successively heated from 300 to 400° C., maintained at 400° C. for 4 hours, then finally cooled at a rate of 90° C./h to 300° C. The fluidising air is then replaced by a dry nitrogen stream and the catalytic solid is cooled slowly to ambient temperature.

30 kilograms of an activated catalyst containing 3.8% by weight of titanium and 1% by weight of chromium are recovered; this catalyst is composed of particles with a weight average diameter of 103 μm. It is stored in an atmosphere of dry nitrogen.

b) Prepolymer Preparation

An operation of prepolymerisation is carried out in a reactor of capacity 1 m3 equipped with a heating jacket and a stirrer turning at 140 rpm. The prepolymerisation is carried out at 75° C. in 450 liters of n-hexane in the presence of 15 grams of an antistatic agent, sold under the registered trade mark <<ASA-3>> (by Shell, Holland), which contains 0.55 weight percent of both chromium and calcium, and 10 kilograms (1.92 moles of chromium) of the catalyst described above (9a).

The reactor is set up with ethylene fed from a line pressurised to 1.0 MPa. A constant feed rate of 15 kilograms/h of ethylene is established. After 4 hours and 32 minutes of prepolymerisation, 82.8 kilograms of prepolymer are formed. The supernatant liquid is drained off and the prepolymer is then dried in a recycled dry nitrogen stream. The dry prepolymer thus obtained has excellent flow properties and a bulk density of 420 kg/m3. It is made up of particles with a mean diameter of 169 μm.

c) Fluidised Bed Gas Phase Polymerisation of Ethylene 100 kilograms of a well dried polyethylene powder prepared in a previous polymerisation are charged to a fluidised bed reactor 45 cm in diameter. This is fluidised at 96° C. by a mixture of gases composed of hydrogen, ethylene and nitrogen flowing upwards at 35 cm/s. In the gas mixture the partial pressures of the constituents are:

| | |
|---|---|
| hydrogen | 0.30 MPa |
| ethylene | 1.22 MPa |
| nitrogen | 0.48 MPa. |

2 liters of a 0.1 molar solution of triethylaluminium in n-hexane are fed to the reactor and these conditions are maintained for 1 hour to start up the reaction. The prepolymer prepared previously (Example 9b) is then fed to the reactor at a rate of 99 grams/h. After a period of stabilisation of the polymerisation conditions, 20 kilograms/h of polymer are produced with the following properties:

| | |
|---|---|
| Bulk density | 345 kg/m3 |
| Melt index | 0.90 g/10 min |
| Flow parameter (n) | 2.09 |
| Density | 955 kg/m3 |
| Mean particle size | 1140 μm |
| Fines (<125 μm) | 1.4% by weight |
| Residual chromium | 5.5 ppm |

EXAMPLE 10 a) Catalyst Preparation 280 kilograms of a chromium oxide based catalyst composition sold under the registered trade mark <<EP30>> (by Joseph Crosfield and Sons, Warrington, United Kingdom) are introduced into a reactor heated to 60° C. and fluidised with a current of dry nitrogen flowing upwards at 12 cm/s. This solid composition contains about 1% by weight of chromium in the form of trivalent chromium acetate supported on silica. The reactor is then heated from 60 to 150° C. at a rate of 90° C./h and is maintained at 150° C. for 30 minutes. Thereafter 80 kilograms of a mixture of titanium tetraisopropylate and tetra-n-butylate sold under the registered trade mark <<Tilcom BIP>> (by Titanium Intermediates Limited, Billingham, United Kingdom) are added to the reactor. The catalytic solid thus formed is maintained at 150° C. for 2 hours. The reactor is then heated to 300° C. at a rate of 90° C./h and is maintained at this temperature for 4 hours. The fluidising nitrogen is then replaced by a dry air stream and the catalytic solid is successively heated from 300 to 450° C., maintained at 450° C. for 5 hours, then finally cooled at a rate of 90° C./h to 200° C. The fluidising air is then replaced by a dry nitrogen stream and the catalytic solid is cooled slowly to ambient temperature.

b) Fluidised Bed Gas Phase Polymerisation of Ethylene 40 tons of a well dried polyethylene powder prepared in a previous polymerisation are charged to a fluidised bed reactor 3.5 m in diameter. This is fluidised at 94.5° C. by a mixture of gases composed of hydrogen, ethylene, ethane, pentane and nitrogen flowing upwards at 49 cm/s. In the gas mixture the partial pressures of the constituents are:

| | |
|---|---|
| hydrogen | 0.30 MPa |
| ethylene | 0.39 MPa |
| ethane | 0.20 MPa |
| pentane | 0.10 MPa |
| nitrogen | 1.21 MPa. |

Pentane is a mixture of n-pentane and of isopentane.

The catalyst prepared previously (Example 10a) is then fed to the reactor at a rate of 2 kilograms/h. After a period of stabilisation of the polymerisation conditions, 5 tons/h of polymer are produced with the following properties:

| | |
|---|---|
| Bulk density | 380 kg/m3 |
| Melt index (5 kg load) | 1.2 g/10 min |
| Flow parameter (n) | 2.26 |
| Density | 956.1 kg/m3 |
| Mean particle size | 1080 μm |
| Fines (<25 μm) | 1.4% by weight |
| Residual chromium | 4.0 ppm |
| Stress crack resistance | 8.9 hours |
| Critical shear rate | 1390 s-1 |

EXAMPLE 11

Comparative a) Catalyst Preparation 400 kilograms of a chromium oxide based catalyst composition sold under the registered trade mark <<EP30>> (by Joseph Crosfield and Sons, Warrington, United Kingdom) are introduced into a reactor heated to 60° C. and fluidised with a current of dry nitrogen flowing upwards at 12 cm/s. This solid composition contains about 1% by weight of chromium in the form of trivalent chromium acetate supported on silica. The reactor is then heated from 60 to 150° C. at a rate of 90° C./h and is maintained at 150° C. for 30 minutes. Thereafter 114 kilograms of a mixture of titanium tetraisopropylate and tetra-n-butylate sold under the registered trade mark <<Tilcom BIP>> (by Titanium intermediates Limited, Billingham, United Kingdom) are added to the reactor. The catalytic solid thus formed is maintained at 150° C. for 2 hours. The reactor is then heated to 300° C. at a rate of 90° C./h and is maintained at this temperature for 4 hours. The fluidising nitrogen is then replaced by a dry air stream and the catalytic solid is successively heated from 300 to 550° C., maintained at 550° C. for 5 hours, then finally cooled at a rate of 90° C./h to 200° C. The fluidising air is then replaced by a dry nitrogen stream and the catalytic solid is cooled slowly to ambient temperature.

b) Fluidised Bed Gas Phase Polymerisation of Ethylene 40 tons of a well dried polyethylene powder prepared in a previous polymerisation are charged to a fluidised bed reactor 3.5 m in diameter. This is fluidised at 101.5° C. by a mixture of gases composed of hydrogen, ethylene, ethane, pentane and nitrogen flowing upwards at 49 cm/s. In the gas mixture the partial pressures of the constituents are:

| | |
|---|---|
| hydrogen | 0.30 MPa |
| ethylene | 0.32 MPa |
| ethane | 0.20 MPa |
| pentane | 0.10 MPa |
| nitrogen | 1.28 MPa. |

Pentane is a mixture of n-pentane and of isopentane.

The catalyst prepared previously (Example 11a) is then fed to the reactor at a rate of 2 kilograms/h. After a period of stabilization of the polymerisation conditions, 5 tons/h of polymer are produced with the following properties:

| | |
|---|---|
| Bulk density | 380 kg/m3 |
| Melt index (5 kg load) | 1.2 g/10 min |
| Flow parameter (n) | 2.13 |

-continued

| | |
|---|---|
| Density | 954.8 kg/m3 |
| Mean particle size | 1190 μm |
| Fines (<125 μm) | 1.6% by weight |
| Residual chromium | 3.5 ppm |
| Stress crack resistance | 7.0 hours |
| Critical shear rate | 910 s-1. |

What is claimed is:

1. In a process for the preparation of a chromium oxide based catalyst supported on a granular or microspherical refractory oxide for use in the gas phase polymerisation of olefin(s), the improvement comprising subjecting a supported chromium oxide based catalyst to a sole calcination/activation step consisting of a single thermal treatment performed at a temperature ranging from 200 to 450° C. under an oxygen-containing atmosphere.

2. The process according to claim 1, wherein the single thermal treatment is performed at a temperature ranging from 300 to 400° C.

3. The process according to claim 1, wherein the oxygen-containing atmosphere is air.

4. The process according to claim 1, wherein the supported chromium oxide based catalyst is a titanium or aluminum modified supported chromium oxide based catalyst.

5. The process according to claim 4, wherein the supported chromium oxide based catalyst is a titanium modified supported chromium oxide based catalyst.

6. In a process for the gas phase polymerisation of at least one alpha olefin containing from 2 to 12 carbon atoms, performed with the aid of a chromium oxide based catalyst supported on a granular or microspherical refractory oxide, the improvement comprising, subjecting the catalyst, prior to its use in the polymerisation, to a sole calcination/activation step consisting of a single thermal treatment performed at a temperature ranging from 200 to 450° C. under an oxygen-containing atmosphere.

7. The process according to claim 6, further comprising recovering a polymer product having a melt index higher than a melt index of a polymer product produced by polymerizing the same alpha olefin using the same, polymerization conditions and catalyst composition, but wherein the catalyst has been subjected to a single thermal treatment performed at a temperature higher than 45° C.

* * * * *

UNITED STATES PATENT AND TRADEMARK OFFICE
CERTIFICATE OF CORRECTION

PATENT NO. : 6,372,867 B1
DATED : April 16, 2002
INVENTOR(S) : John Grabriel Speakman It is certified that error appears in the above-identified patent and that said Letters Patent is hereby corrected as shown below:

<u>Column 12,</u>
Line 23, "45º C." should read -- 450º C. --.

Signed and Sealed this

Fifth Day of November, 2002

*Attest:*

JAMES E. ROGAN
*Attesting Officer*     *Director of the United States Patent and Trademark Office*